United States Patent [19]
Diez

[11] Patent Number: 5,740,978
[45] Date of Patent: Apr. 21, 1998

[54] AUTOMATIC SEAT-BELT DISPENSER

[76] Inventor: Martin Diez, Grandl-Str. 28, D-81247 Munchen, Germany

[21] Appl. No.: 757,671

[22] Filed: Nov. 29, 1996

[30] Foreign Application Priority Data

Nov. 28, 1995 [DE] Germany .................. 195 44 302.0

[51] Int. Cl.$^6$ .................................................. B60R 22/34
[52] U.S. Cl. .................................................. 242/375.3
[58] Field of Search .......................... 242/375.1, 375.3; 280/805, 806, 807

[56] References Cited

U.S. PATENT DOCUMENTS

| | | | |
|---|---|---|---|
| 4,099,683 | 7/1978 | Stouffer et al. | 242/375.3 |
| 4,290,564 | 9/1981 | Karlsson | 242/375.3 |
| 5,409,176 | 4/1995 | Kopetzky | 242/375.3 |
| 5,624,084 | 4/1997 | Kopetzky et al. | 242/375.3 |
| 5,628,470 | 5/1997 | Ray et al. | 242/375.3 |

FOREIGN PATENT DOCUMENTS

| | | |
|---|---|---|
| 2618715 | 11/1977 | Germany . |
| 3313580 | 10/1983 | Germany . |
| 4241730 | 6/1994 | Germany . |

*Primary Examiner*—John P. Darling
*Attorney, Agent, or Firm*—Browdy and Neimark

[57] ABSTRACT

In an automatic seat-belt dispenser with a seat belt (7) that can be wound up and unwound, a multi-stage step-down gear is disposed between the winder shaft (1) of the seat belt and an energy storing (6), and a plurality of belts (2-3g, 3k-4g, 4k-5) are provided between the elements (2-5) of the gear. With this seat-belt embodiment, a linear and preferably linearly decreasing course of force with respect to the pulled-out length of the seat belt is attained.

8 Claims, 4 Drawing Sheets

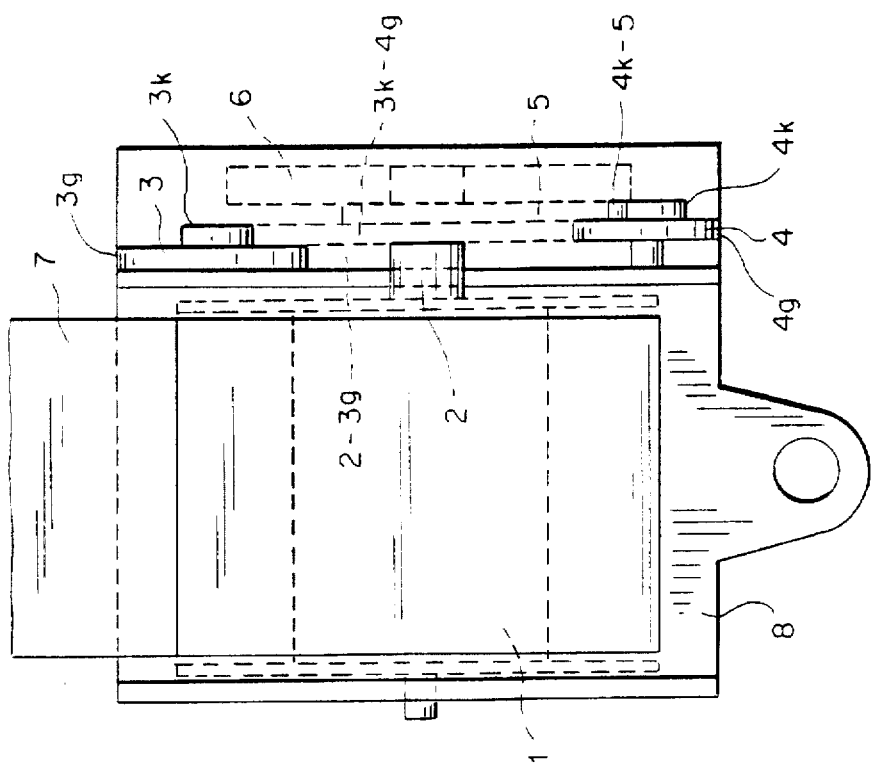
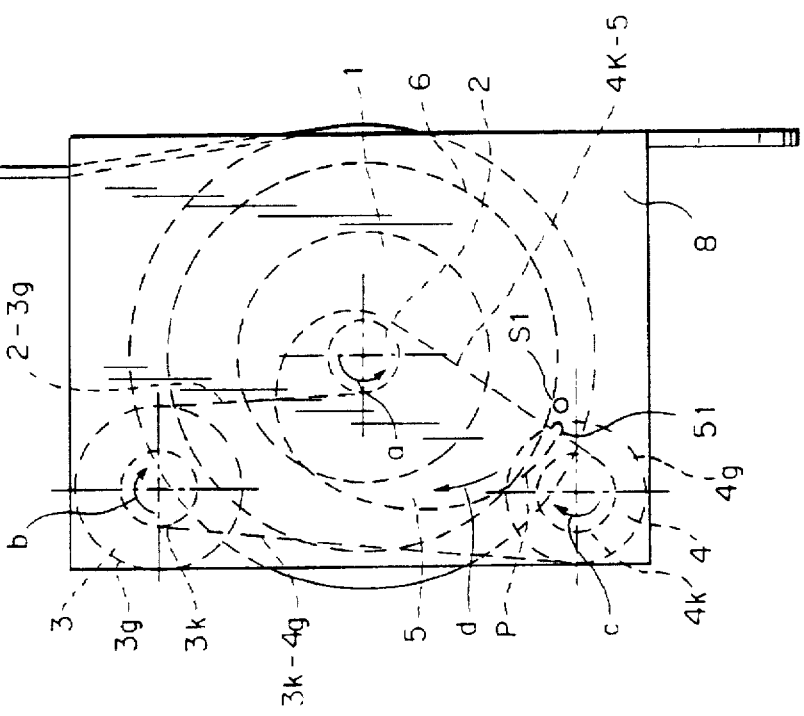

AUTOMATIC SEAT-BELT DISPENSER

BACKGROUND OF THE INVENTION

1. Technical Field of the Invention

The invention relates to an automatic seat-belt dispenser.

2. Prior Art

In conventional automatic seat-belt dispensers, of the kind used in passenger cars, for instance, a seat belt is wound up on a winder shaft accommodated in a housing. The winder shaft is connected to one end by a spiral spring whose other end is firmly connected to the housing. In the known automatic seat-belt dispensers, the work brought to bear in pulling out or unrolling the seat belt is stored in the spiral spring, since the spiral spring is tensed by the rotation of the winder shaft. The energy stored in the spiral spring is later released when the seat belt is rolled up.

In conventional automatic seat-belt dispensers, when the seat belt is unrolled all the way, the winder shaft generally rotates 12 times, and thus as the seat belt is unwound out of the housing the spiral spring forms a number of windings that corresponds to the number of revolutions of the winder shaft. Since by their design, spiral springs have rising force characteristic curves over the number of revolutions, the tensile force required to pull out the seat belt increases as the extended portion of the seat belt increases.

The course of the force to be brought to bear with respect to the extended portion in such automatic seat-belt dispensers rises exponentially as the extended portion increases, as represented by a curve sketched in FIG. 6a.

Thus particularly in the so-called slack range, high tensile forces occur in the belt; the slack range is the range within which the seat belt is meant to be further extended beyond the extended portion necessary for a person to be buckled up, for instance so the person can reach the glove compartment. The dashed line of the slack range on the left in FIG. 6a shows the extended portion of the seat belt when a buckled-in person leans back in the seat, while the dashed line on the right in FIG. 6a indicates the end of the slack range, which is determined by the length of the seat belt and thus indicates the maximum freedom of motion of a buckled-up person. In the fully extended state, the greatest force is thus exerted on the seat belt.

This kind of course of force, as sketched in FIG. 6a, proves to be unpleasant in terms of effort, even while the seat belt is being pulled out and thus unrolled, and moreover proves uncomfortable once the belt is in place, because the seat belt exerts a relatively strong contact pressure on the body; particularly in relatively long trips, this is perceived as an unnecessary irritation. This is especially disadvantageous in vehicles that have no B pillar, since the upper seat belt mount is above the shoulder level and thus the pressure exerted on the shoulder by the seat belt is even greater than with an automatic seat-belt dispenser disposed in the B pillar.

This is why so-called soft automatic seat-belt dispensers are currently offered; they represent an improvement over the above-described automatic seat-belt dispensers, since in these newer automatic seat-belt dispensers the incident forces in the slack range are less than in conventional automatic seat-belt dispensers.

In a known embodiment of one such soft automatic seat-belt dispenser, two parallel-disposed springs are provided, one of which can be put into and out of action via a mechanical or electrical device. This spring is put into action when one begins to pull the seat belt out of the housing, and is thus tensed. Shortly before the beginning of the slack range, indicated by the dashed line on the left, is reached, this spring is put out of action, so that now only the second, constantly operative spring acts upon the seat belt. Pulling the seat belt out farther thus requires less expenditure of force than in the automatic seat-belt dispensers described at the outset, since in the slack range of a soft automatic seat-belt dispenser, less-strong forces act on the seat belt.

The resultant course of force as a seat belt is pulled out is schematically shown in FIG. 6b. When the seat belt is released from the buckle, the switchable spring is put back into action, in order to assure satisfactory winding up of the seat belt. Compared with the conventional automatic seat-belt dispensers, in the soft automatic seat-belt dispenser the primary disadvantages are the complicated electrical or mechanical control for putting the switchable spring into or out of action and the requisite additional spring.

A disadvantage of the known automatic seat-belt dispensers described above is first that to store energy the spring or springs must be tensed accordingly to suit the high number of revolutions of the winder shaft, and second, the correspondingly high number of windings of the spring or springs rest on one another in the tensed state and thus have hysteresis. The result is an energy loss which must be compensated for by the use of correspondingly strong springs. As a result, even stronger forces act on the seat belt, which makes them even more uncomfortable.

In other versions of soft automatic seat-belt dispensers, a toothed-wheel gear is disposed between the winder shaft, onto which the seat belt is wound and from which it is unwound, and the spiral spring connected to the housing. This gear steps down the revolutions of the winder shaft and acts on one or more springs via variable lever arms. Such a variable lever arm is known in conjunction with a toothed-wheel gear, for instance from German Patent Disclosure DE 26 18 715. This disclosure describes a gear for continuously changing the rpm of a limited rotary motion, by using two meshing gear wheels whose pitch circle radii vary steadily in a spiral.

In this very complicated and expensive version, because of the use of gear wheels, additional friction losses occur in the gear and therefore stronger springs are required, since it must be assured that a certain residual force is exerted even on the wound-up seat belt, in order to assure its being wound up completely. Thus the comfort in the slack range that was attained by interposing the toothed-wheel gear is simply made worse again.

In other soft automatic seat-belt dispensers, one or more conical spirals are disposed between the winder shaft and a retraction spring that is provided for winding up the seat belt. As a result of these spirals, the lever arm acting on the retraction spring which the seat belt is being pulled out is varied, so that in the slack range of this soft automatic seat-belt dispenser, lesser forces arise than conventional automatic seat-belt dispensers. The retraction spring is connected via a thin filament, which is used as a pulling means, to one or more spirals whose spiral windings are disposed side by side, in the manner of a screw thread. Since the number of spiral windings must correspond to the number of revolutions of the winder shaft, which in general is 12 revolutions when the seat belt is fully extended, the result is a large structural height of this soft automatic seat-belt dispenser.

From German Patent Disclosure DE 42 41 730 A1, for instance, an arrangement similar to the arrangement described above is known. Here, instead of conical spirals for winding up and unwinding a thin filament, cable rollers are provided, of which one is hemispherical and the other is formed complementary to it. Because of the shape of the cable rollers used, the course of the force in the slack range of the seat belt can be adjusted. The automatic seat-belt dispenser described in DE 42 41 730 still has the above-described disadvantage that such rollers must have at least 12 windings.

From German Patent Disclosure DE 33 13 580, a windup device for automatic seat-belt dispensers is known in which in addition to a toothed-wheel gear, spirally slotted cone wheels are provided. The spirally slotted cone wheels, which are connected to one another by means of a three-dimensional spiral tension member, has a lesser number of windings, because of the preceding gear wheel stage, than the above-described cable rollers or conical spirals. However, this windup device still has the disadvantage that gear wheels must be provided for step-down purposes. Because of the friction that occurs between gear wheels, friction losses arise, which must be compensated for by a correspondingly stronger spring. The forces occurring in the slack range are thus relatively high, since the retraction spring in this state is already tensed relative strongly. Moreover, because a gear wheel stage and a spirally slotted cone wheel are connected in line, the structural height is relatively large.

OBJECT AND SUMMARY OF THE INVENTION

The object of the invention is therefore to create an automatic seat-belt dispenser that requires the least possible space, and in which above all that in the slack range, the lowest possible forces acting on the seat belt are preserved and hysteresis losses are as slight as possible. Moreover, the course of the force should be adjustable as a function of the total extended length.

According to the invention this object is attained by providing a plurality of belts between the elements of a multi-stage step-down gear. The multi-stage step-down gear being located between a winder shaft and an energy storing means of the automatic seat belt dispenser. In a preferred feature of the automatic seat-belt dispenser according to the invention, a first belt connects a circular pulley, provided on the winder shaft of the automatic seat-belt dispenser to a first double pulley that is formed by two concentric pulleys of different radii. Between the smaller pulley of the first double pulley and a larger pulley of a second double pulley, which is embodied analogously to the first double pulley, optionally with differently dimensioned pulley diameters, a second belt is provided. Finally, the smaller pulleys of the second double pulley is connected by means of a third belt to a pulley that has a substantially spiral circumferential line and will therefore, for the sake of simplicity, also be called a spiral pulley hereinafter. Via the spiral pulley, energy is supplied to or removed from the energy storing means.

With the aid of the step-down gear formed according to the invention, the requisite 12 revolutions of the winder shaft needed in conventional automatic seat-belt dispensers to completely unroll the seat belt are accordingly converted into fewer than one revolution of the spiral pulley, preferably a 0.75 revolution, for instance, and thus into fewer than one revolution of a spiral spring which, in a preferred further feature of the invention, is provided as an energy storing means. Thus the hysteresis loss that occurs in the spring or springs in the known automatic seat-belt dispensers is precluded in the automatic seat-belt dispenser of the invention, since when a spiral spring is used as an energy storing means, its individual windings no longer rest on one another.

Because of the embodiment of the spiral circumferential line of the spiral pulley, the effective lever arm in each case varies as a function of the lengths of the third connecting belt applied to the spiral pulley. Thus the force that acts upon the third belt, provided between the spiral pulley and the small pulley of the second double pulley, and thus in the final analysis via the other two belts on the seat belt as well, depends very substantially on the embodiment of the shape of the spiral pulley.

By means of a suitable embodiment and design of the spiral pulley and a suitable adaptation of the ratios between the radii of the double pulleys, the course of a force required to unroll the seat belt can be adjusted over the total extended length of the seat belt in such a way that in the slack range defined at the outset, the force acting in the seat belt is markedly less than in the known automatic seat-belt dispenser. Unlike the course shown in FIG. 6a or FIG. 6b for a force occurring as a seat belt is unrolled, the course of force in the seat belt of the invention is constant, or even decreases linearly.

In a further preferred embodiment, a spiral pulley is designed such that it has a spirally extending circumferential line only in some portions. With a spiral pulley of this kind, it is attainable that as the seat belt is unwound, the course of force, which is constant at a relatively high level or drops linearly, or in other words the force to be brought to bear shortly before the so-called slack range is reached, drops to a considerably lower force level, and at this low level the course of force is then once again constant or decreases linearly.

The invention thus creates an automatic seat-belt dispenser in which by means of a suitable design of the multi-stage step-down gear, and particularly by the embodiment and design of the spiral pulley associated with the energy storing means, the force required to unroll the seat belt is adjustable, and in particular the force to be brought to bear in the so-called slack range is very slight, and thus the contact pressure acting upon the passenger is also correspondingly low.

Both in the known automatic seat-belt dispenser and in the automatic seat-belt dispenser of the invention, a certain residual force is necessary in the energy storing means. This residual force acts on the wound-up seat belt so that it will be reliably restrained in a housing surrounding the automatic seat-belt dispenser. This residual force, which both in the various versions and in the automatic seat-belt dispenser of the invention is predetermined, represents the starting point for the various courses of force. While in the various versions of the known automatic seat-belt dispensers the force courses are of the kind as shown for instance in FIG. 6a or FIG. 6b, in an automatic seat-belt dispenser embodied according to the invention it is especially advantageous that beginning at the predetermined residual force, not merely a constant but even a linearly decreasing course of the force is attainable.

Above all, it is advantageous in the automatic seat-belt dispenser of the invention that particularly for the double pulleys, only very small windup and unwinding diameters are necessary, and the belts used in the multi-stage step-down gear provided according to the invention need to be only 0.02 mm thick, for instance, the requisite strength of the belts being attainable via their width.

The invention is described in detail below in terms of preferred embodiments, with reference to the accompanying drawings.

BRIEF DESCRIPTION OF THE DRAWINGS

FIG. 1 shows a schematic side view of a preferred embodiment of an automatic seat-belt dispenser with a wound-up seat belt;

FIG. 2 shows a schematic front view of the automatic seat-belt dispenser of FIG. 1;

DETAILED DESCRIPTION OF THE PREFERRED EMBODIMENT(S) OF THE INVENTION

Figure 3:
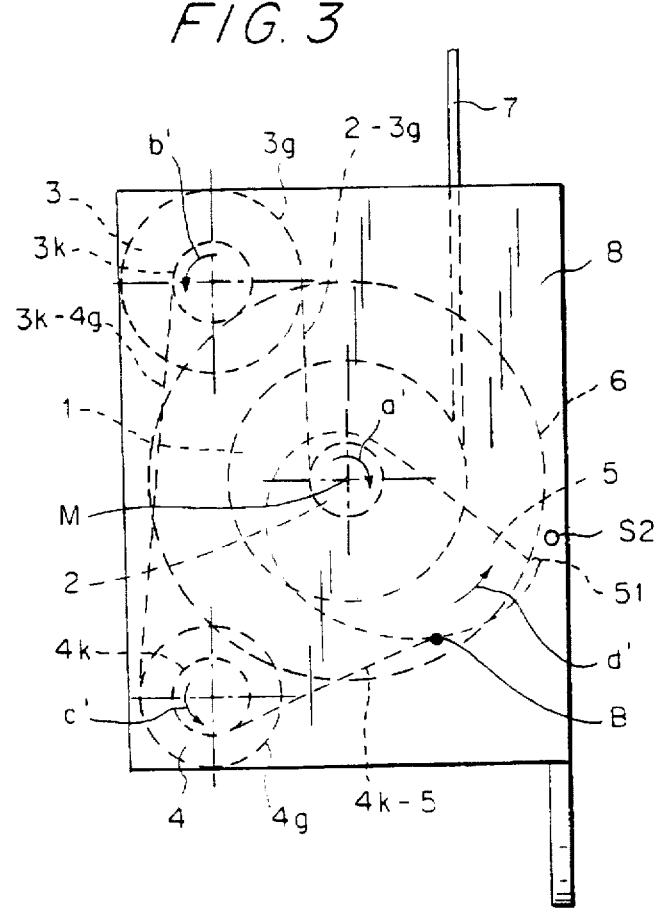
FIG. 3 shows a schematic side view of the automatic seat-belt dispenser of FIGS. 1 and 2 with the seat belt extended.

In FIGS. 1 and 2, a schematic side view and a schematic front view, respectively, of a preferred embodiment of an automatic seat-belt dispenser are shown. In FIGS. 1 and 2, an extended seat belt 7 is wound all the way up onto a winder shaft 1, supported in a housing 8, with which shaft a circular pulley 2 of relatively small diameter is fixedly connected. Also rotatably supported in the housing 8 are a first and second double pulley 3 and 4 and a pulley 5 with a substantially spiral circumferential line. The pulley 5 will hereinafter be called the spiral pulley 5, for the sake of simplicity. The two double pulleys 3 and 4 each comprise two concentric pulleys 3k and 3g and 4k and 4g, respectively. The letters k and g express the fact that the pulley 3k and 4k each have a smaller radius than the pulleys 3g and 4g of larger radius. The two double pulleys 3 and 4 are embodied concentrically and preferably in one piece.

Between the pulley 2 connected to the winder shaft and the larger pulley 3g of the first double pulley 3, a first belt 2-3g is provided. A second belt 3k-4g is provided between the smaller pulley 3k of the first double pulley 3 and the larger pulley 4g of the second double pulley 4. A third belt 4k-5 is provided between the small pulley 4k of the second double pulley and the spiral pulley 5.

In FIGS. 1-3, a spiral spring 6 is schematically indicated as an energy storing means. The spring 6 is secured by one end to the spiral pulley 5 and to the other end by the housing 8. The three belts 2-3g, 3k-4g and 4k-5 are thus disposed in different planes, as can be seen from the side view of FIG. 2. The circular pulley 2 connected to the winder shaft, the two double pulleys 3 and 4, and the spiral pulley 5, as well as the three belts 2-3g, 3k-4g and 4k-5 provided between the individual pulleys form the multi-stage step-down gear.

The reference numerals joined by a hyphen for the three belts indicate which two pulleys the two ends of the respective belt are connected to. Thus the second belt 3k-4g, for instance, is connected by one end to the small pulley 3k to the first double pulley 3 and by the other end to the large pulley 4g of the second double pulley 4.

If the seat belt 7 is pulled out of the housing 8, which for instance is mounted on the B column, this unwinds the seat belt 7 from the winder shaft 1 and rotates this shaft in the direction represented by an arrow a in FIG. 1. As a result, the pulley 2 fixedly connected to the winder shaft 1 is likewise rotated counterclockwise, in the direction represented by the arrow a. In this rotary motion, the first belt 2-3g is unwound from the larger pulley 3g of the first double pulley 3 and is wound up onto the circular pulley 2; in the process, the first double pulley 3 rotates clockwise in the direction of an arrow a. At the same time, the second belt 3k-4g is unwound from the larger pulley 4g of the second double pulley 4 and is wound onto the smaller pulley 3g of the first double pulley 3, so that the second double pulley 4 rotates clockwise in the direction represented by an arrow c in FIG. 1. By the clockwise rotary motion of the second double pulley 4, the third belt 4k-5 is wound onto the small pulley 4k of the second double pulley 4.

The third belt 4k-5, which leads from the double pulley 4, or its small pulley 4k, to the spiral pulley 5, rests on the spiral circumferential line of the latter pulley and is secured to the spiral pulley 5 at a point P (see FIG. 1). As a result of the winding up of the belt 4k-5 onto the small pulley 4k of the double pulley 4 in the direction represented by the arrow c, the spiral pulley 5 is rotated clockwise, in the direction represented by an arrow d. By the clockwise rotary motion of the spiral pulley 5, the spiral spring 6 (FIG. 2) acting as an energy storing means is tensed. As already noted, this spring is secured by one end to the spiral pulley 5 and by the other end to the housing 8.

After the seat belt 7 is released from a belt buckle, not shown, the two double pulleys 3 and 4 as well as the circular pulley 2 and the spiral pulley 5, which are connected by the three belts 2-3g, 3k-4g and 4k-5 disposed among these pulleys, are rotated counter to the directions represented by the arrows a–d. The residual force of the spiral spring 6 acting as an energy storing means is then dimensioned such as to assure that the seat belt wound onto the winder shaft 1 is reliably restrained in the housing 8.

In FIG. 3, a schematic side view of the embodiment of the automatic seat-belt dispenser shown in FIGS. 1 and 2 is shown, in which the seat belt 7 is completely extended from the winder shaft 1. Because of the above-described connection between the winder shaft 1, or the circular pulley 2 fixedly joined to it, and the spiral pulley 5 connected to the energy storing means 6 via the three belts provided between them, the spiral pulley 5 is now in a position that is rotated 270° relative to the position shown in FIG. 1, in the embodiment shown.

This slight rotation of the spiral pulley 5 by only a three-quarter revolution, by comparison with 12 revolutions of the winder shaft 1 when the seat belt 7 has been completely unwound from it, is possible because of the step-down attained by the two pulleys 2 and 5 as well as the two double pulleys 3 and 4. Because of the fixed connection of the spiral spring 6, on the one hand to the spiral pulley 5 and on the other to the housing 8, the spiral spring 6 is likewise prestressed, in the preferred embodiment shown, by only 270°.

If the seat belt 7 is now let go, i.e. released from the buckle so that it winds up onto the winder shaft 1, the release of the energy stored in the energy storing means 6, or in other words the relief of the spiral spring 6, causes a 0.75 rotary motion of the spiral pulley 5 as well as rotary motions of the two double pulleys 3 and 4 and the circular pulley 2, and thus of the winder shaft 1 connected to it, in the directions represented by the arrows a'–d' in FIG. 3, which as already noted above are opposite the directions of the arrows a–d shown in FIG. 1.

The torque stored in the spiral spring 6 acting as an energy storing means as the seat belt 7 unwinds is converted, because of the embodiment of the spiral pulley 5, into a nonconstant force in the third belt 4k-5 that varies in the winding up of the seat belt 7, specifically, because, as a result of the spirally embodied circumferential line of the spiral pulley 5, the lever arm varies, for a constant torque output by the spiral spring 6, as a function of the length of the third belt 4k-5 contacting the spiral pulley 5. The lever arm is in each case the distance between the center point M of the winder shaft 1 and a contact point B (see FIG. 3) between the belt 4k-5 and the spiral pulley 5.

The force acting on the belt 4k-5 is transmitted to the seat belt 7 via the two double pulleys 4 and 5, the circular pulley 2, and the winder shaft 1 connected to the latter pulley. The force acting on the seat belt 7 is thus dependent on the ratios of the radii of the two different-sized pulleys 3k and 3g, and 4k and 4g, respectively, of the two double pulleys 3 and 4, on the embodiment and shape of the spiral circumferential line of the spiral pulley 5, and on the extended length of the seat belt 7, among other factors. The term "extended length" is understood here to mean the length of the seat belt 7 that has been unwound from the winder shaft 1.

Figure 4A:
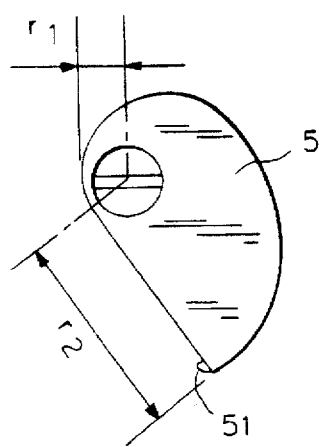
FIGS. 4a and 4b shows schematic views of preferred embodiments of spiral pulleys used in the automatic seat-belt dispenser of the invention.

In addition, the force acting on the seat belt 7 is dependent on the dimensioning of the spiral spring 6 acting as an energy storing means and on the thickness of the seat belt 7, since it depends on the extended length and the resultant number of windings remaining on the winder shaft 1, the lever arm between the seat belt 7 and the winder shaft 1 changes. The course of force in the seat belt 7 with respect to the extended length is thus dependent on a number of parameters. However, it can be varied in a simple way, above all by means of the embodiment and shape of the spiral circumferential line and the spiral pulley 5. Preferred embodiments of the spiral pulleys are shown schematically in FIGS. 4a and 4b. With the spiral pulley 5 shown in FIG. 4a, a linearly dropping course of force in the seat belt 7 relative to the extended length of the seat belt 7 is attainable. A course of force attainable with the spiral pulley 5 shown in FIG. 4a is represented by graphs in FIG. 5a. In FIG. 5a, the force is plotted on the abscissa and the extended length on the ordinate. The rise in the characteristic curve of the course of force over the extended length is adjustable by means of a ratio of radii r1/r2 of the spiral pulley 4 in FIG. 4a.

Figure 5A:
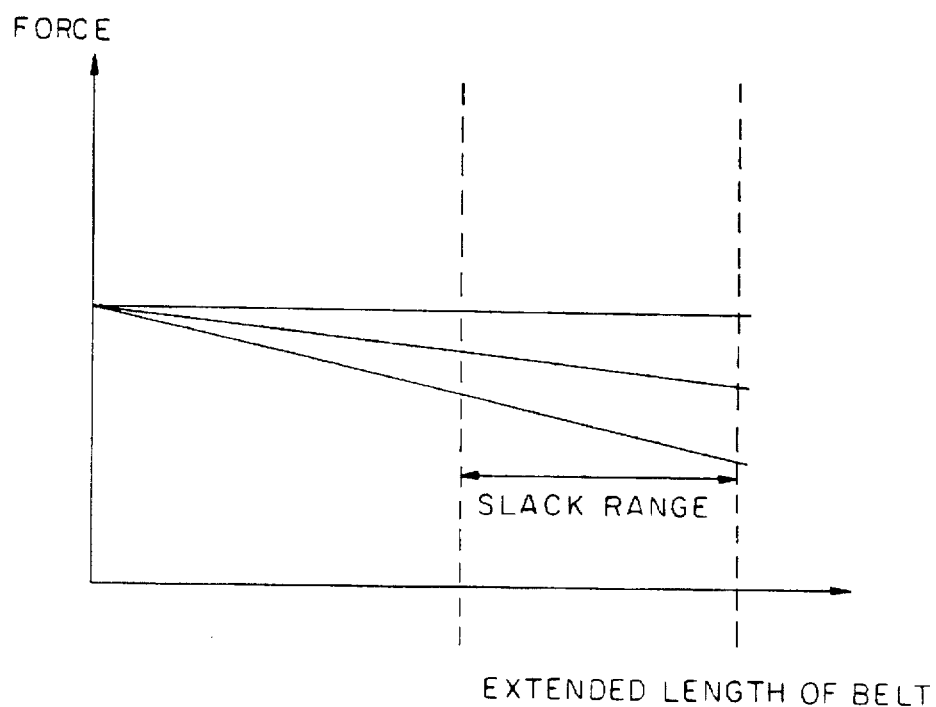
FIGS. 5a and 5b shows graphs of curve courses of automatic seat-belt dispensers designed according to the invention, in which the force is plotted on the abscissa and the pulled-out length of a seat belt is plotted on the ordinate.
Figure 6A:
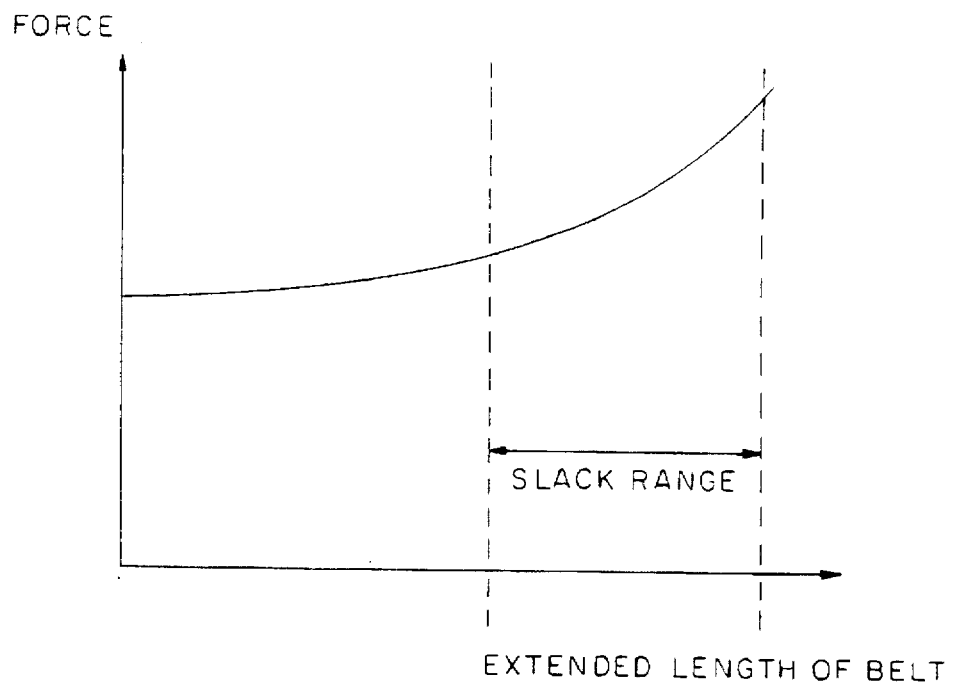
FIGS. 6a and 6b shows graphs corresponding to the graphs of FIGS. 5a and 5b, of curve courses of known automatic seat-belt dispensers.
Figure 6B:
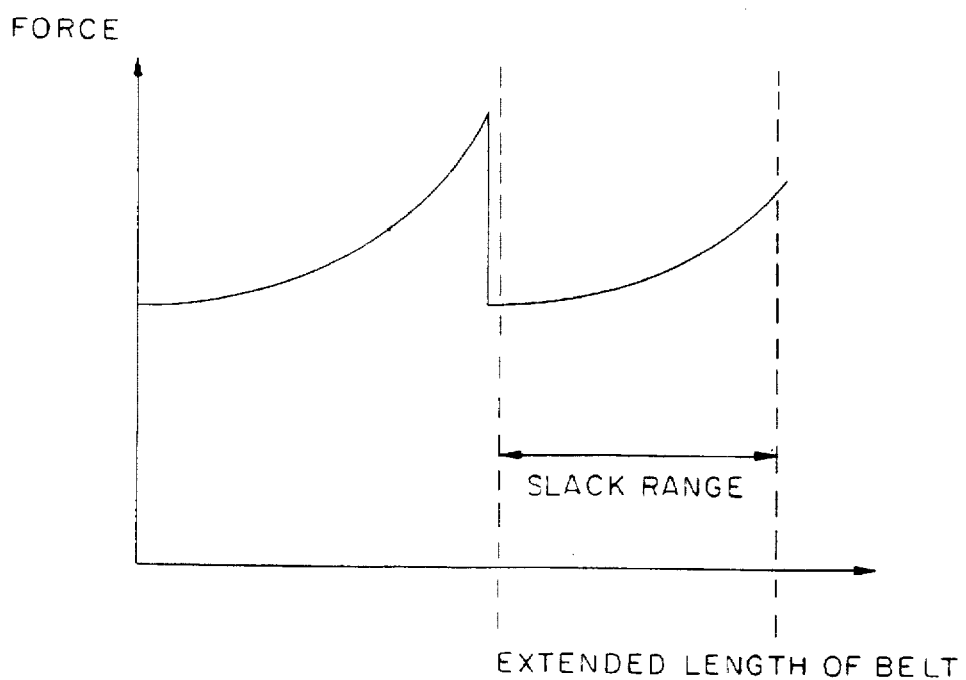

For example, in FIG. 5a a plurality of curve courses for the force relative to the extended length are shown for various embodiments of the spiral pulley 5 found in FIG. 4a. However, the characteristic curves shown in FIG. 5a clearly illustrate the fact that the forces occurring in the so-called slack range are considerably less, in comparison with the forces occurring in conventional automatic seat-belt dispensers, as a comparison of the characteristic curves in FIGS. 5a and FIG. 6a impressively confirms.

Figure 4B:
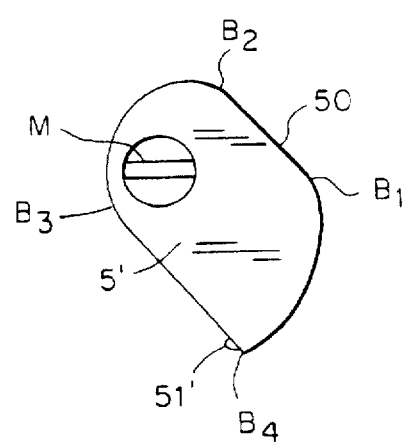
Figure 5B:
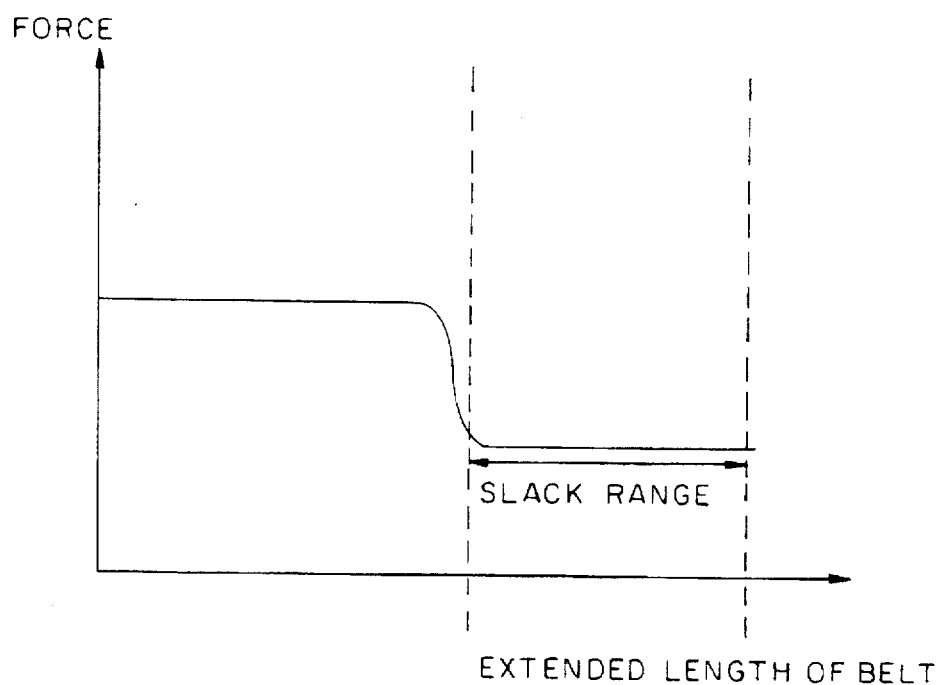

In FIG. 5b, a different preferred embodiment of a spiral pulley 5' is shown, which has a spiral course only in portions, namely in the regions between points B1 and B4 and between B2 and B3 (see FIG. 4B). If an embodiment of the spiral pulleys 5' as shown in FIG. 4b is used in the automatic seat-belt dispenser according to the invention, then in the so-called slack range, a very low constant force, which acts on the seat belt, can be attained, as can be seen from the graphs of FIG. 5b. This suddenly occurring reduction of force in the seat belt 7 while the seat belt is being unwound from the winder shaft 1 is attainable by means of a suitably embodied flattened portion 50 of the spiral pulley 5' between points and B2, since as the belt 4k-5 is unwound from the spiral pulley 5' (see FIG. 4b), the lever arm between the contact point B2 and the center point M of the spiral pulley 5' is increased to a considerably longer lever arm between the point B1 and the center point M.

Since in the various embodiments a rotary motion of the spiral pulley 5 or 5' by less than one revolution attained even if the seat belt 7 is extended to the maximum extent, the characteristic curves of the force have approximately an identical course both when the seat belt 7 is wound up onto the winder shaft and when it is unwound from it. The reason for this is considered essentially to be that unlike known automatic seat-belt dispensers, in which the individual windings of the spiral spring rest on one another when the seat belt has been wound up, the spiral spring 6 used as an energy storing means in the invention need not execute multiple revolutions, but need merely be rotated once by less than one revolution, and in the embodiment shown by about 270°. For this reason, unlike spiral springs used in known automatic seat-belt dispensers, in the automatic seat-belt dispenser of the invention there are no hysteresis losses in the spiral spring 6 acting as an energy snoring means when the seat belt 7 is either wound onto or unwound from the winder shaft 1.

In all the embodiments described above, a nonextension clip can be provided in a simple way in the automatic seat-belt dispenser. With the aid of securing extraction locking, it is assured that a seal belt, extended a certain length, cannot be extended any further but instead can only be wound up onto the winder shaft again. Securing extension locking is used for instance to securely fasten a child seat that is restrained by means of a seat belt. A securing extraction locking is activated for instance in the following way: The seat belt is unwound completely from the winder shaft or in other words extracted completely. In this stage, for instance via a switch, a kind of ratchet mechanism is switched on that permits rotation of the winder shaft in only one direction, namely allowing the seat ball to be wound up onto the winder shaft. The ratchet mechanism is not turned off until the seat belt has been fully wound onto the winder shaft again, for instance. Thus two switching points are necessary, for instance one with the seat belt fully unwound and another with the seat belt fully wound up.

In conventional automatic seat-belt dispensers, in which the spiral spring executes a plurality of revolutions, generally 12, in the course of complete unwinding of the seat belt, this number of revolutions must be complicatedly and expensively reinforced, for instance with the aid of an additional gear, so that the two switching points can be unequivocally defined.

When the automatic seat-belt dispenser of the invention is used, these two switching points S1 and S2 can be achieved especially simply, however for instance by providing means in form of a projection 51 or 51' on the spiral pulley 5 and 5' respectively by means of which a switch for instance provided to each of the switching points S1 and S2 can be activated. It is only this way that in the above-described embodiments the securing extraction locking can be realized so simply, since the spiral spring 6 and thus the spiral pulley 5 or 5' as belt execute less than one revolution for the complete unwinding of the seat belt 7 from the winder shaft 1.

The foregoing description of the specific embodiments will so fully reveal the general nature of the invention that others can, by applying current knowledge, readily modify and/or adapt for various application such specific embodiments with out departing from the generic concept, and therefore such adaptations and modifications are intended to be comprehended within the meaning and range of equivalents of the disclosed embodiments. It is to be understood that the phraseology or terminology herein is for the purpose of description and not of limitation.

All references cited in this specification are hereby incorporated by reference.

What is claimed is:

1. An automatic seat-belt dispenser having a multi-step-down gear disposed between a winder shaft (1), onto which a seat belt (7) can be wound and from which the seat belt (7) can be unwound, and an energy storage means (6) engaged to said multi-step down gear, the multi-step-down gear being made so that the course of the force required to unwind the seat belt (7) is substantially constant or decreases linearly, said multi-step-down gear comprising a circular pulley (2) provided on the winder shaft (1), at least one double pulley (3, 4), and a pulley (5) having a substantially spiral circumferential line, by way of which energy is supplied to the energy storage means (6) or removed from said energy storage means (6) by a plurality of belts, said circular pulley, said double pulley and said pulley having a substantially spiral circumferential line being connected with one another by said plurality belts (2-3g, 3k-4g, 4k-5).

2. The automatic seat-belt dispenser of claim 1, wherein the circular pulley (2) is connected by means of a first belt of said plurality of belts (2-3g) to a first double pulley (3), formed of a first pair of two concentric pulleys (3g, 3k) of different radii, a first smaller pulley (3k) of said first pair of two concentric pulleys being connected by means of a second belt (3k-4g) of said plurality of belts to a second double pulley (4), formed of a second pair of two concentric pulleys (4g, 4k) of different radii, a second smaller pulley (4k) of said second pair of two concentric pulleys being connected by means of a third belt (4k-5) of said plurality of belts to the pulley (5) having a substantially spiral circumferential line.

3. The automatic seat-belt dispenser of claim 2, wherein switching points (S1, S2) are defined in the region of the energy storing means (6), said switching points (S1, S2) being actuated by means of an element (51, 51') provided on the pulley (5, 5') having a substantially spiral circumferential line, wherein said switching points and said element act to provide a securing extraction locking for said seat belt.

4. The automatic seat-belt dispenser of claim 2, wherein the circumferential line of the pulley (5') having a substantially spiral circumferential line is rectilinear between spiral portions.

5. The automatic seat-belt dispenser of claim 1, wherein the circumferential line of the pulley (5') having a substantially spiral circumferential line is rectilinear between spiral portions.

6. The automatic seat-belt dispenser of claim 5, wherein switching points (S1, S2) are defined in the region of the energy storing means (6), said switching points (S1, S2) being actuated by means of an element (51, 51') provided on the pulley (5, 5') having a substantially spiral circumferential line, wherein said switching points and said element act to provide a securing extraction locking for said seat belt.

7. The automatic seat-belt dispenser of claim 1, wherein switching points (S1, S2) are provided in the region of the energy storing means (6), said switching points (S1, S2) being actuated by means of an element (51, 51') provided on the pulley (5, 5') having a substantially spiral circumferential line, wherein said switching points and said element act to provide a securing extraction locking for said seat belt.

8. The automatic seat-belt dispenser of claim 7, wherein switching points (S1, S2) are defined in the region of the energy storing means (6), said switching points (S1, S2) being actuated by means of an element (51, 51') provided on the pulley (5, 5') having a substantially spiral circumferential line, wherein said switching points and said element act to provide a securing extraction locking for said seat belt.

* * * * *